July 21, 1959

J. BLAND ET AL 2,895,747

WELDED ALUMINUM COATED TUBULAR MEMBER
AND METHOD OF MAKING SAME

Filed May 31, 1955

INVENTORS.
Julius Bland
Edward D. McKeague
By Byron A. Vance
attorney

United States Patent Office 2,895,747
Patented July 21, 1959

2,895,747
WELDED ALUMINUM COATED TUBULAR MEMBER AND METHOD OF MAKING SAME

Julius Bland, Munster, Ind., and Edward D. McKeague, Crete, Ill., assignors to Standard Oil Company, Chicago, Ill., a corporation of Indiana Application May 31, 1955, Serial No. 512,149

7 Claims. (Cl. 285—21)

This invention relates to a method of welding steel members whereby a substantially continuous protective aluminum coating is provided on one surface thereof and more particularly it relates to a method of welding aluminum coated steel pipe whereby a substantially continuous protective aluminum coating is provided on the inside of the pipe.

The use of aluminum coated steel in chemical reactors and the like and particularly in reactors and associated equipment which are alternately exposed to reducing and oxidizing atmospheres has recently become widespread. One problem encountered in using this material of construction has been the method of joining aluminized surface steel members without destroying the protective aluminum coating. Methods such as flange joining have been tried but have not proven completely successful. Welding is the preferred method of joining such aluminized-surface steel members but as ordinarily practiced it destroys the aluminum coating below the root pass weld. The loss of the aluminum coating is highly undesirable from the standpoint of loss of wall thickness due to corrosion and scaling by the exposure of the steel surface to chemical reactants. It is an object of this invention to provide a method of joining steel surfaces whereby a substantially continuous protective aluminum coating is provided.

In large vessels and the like wherein the aluminum coated surface of the steel is accessible, it is possible, by using such methods as aluminum spraying and the like, to reestablish a continuous aluminum coating which has been partially destroyed by welding. When welding smaller objects constructed of aluminum coated steel wherein the aluminum surface is relatively inaccessible, such as in pipe, small vessels, valves and the like, it is highly imperative that a method of welding such tubular members be used whereby the internal aluminum coating not be destroyed. It is a further object of this invention to provide a method of joining steel pipe and the like whereby a substantially continuous protective aluminum coating is provided on the inside of the pipe. These and other objects will become apparent to those skilled in the art as the description of the invention proceeds.

In accordance with our invention, a steel back-up bar is welded on the surface of a steel member which is to be aluminum coated whereby about one half the width of the bar extends beyond the edge of the steel member; in the case of steel pipe which is to be aluminum coated on its inner surface, the bar takes the form of a ring welded to the inner surface of the pipe and extending for about half of its width from the end of the pipe. The back-up bar or ring is at least about 3/16 inch in thickness and is at least about 3/4 inch in width. The surface of the steel member having the back-up bar welded thereto is then coated with aluminum to a depth of not more than about 0.06 inch, preferably by dipping in molten aluminum. A second aluminum-coated steel member is then positioned on the back-up bar in welding relationship to the aluminized steel member provided with the back-up bar and a weld is made whereby the back-up bar is welded to the edges of both steel members by the root pass of the welding step.

In the drawings referred to below, we have shown a preferred embodiment of our invention, it being understood this is by way of example only.

Figure 1:
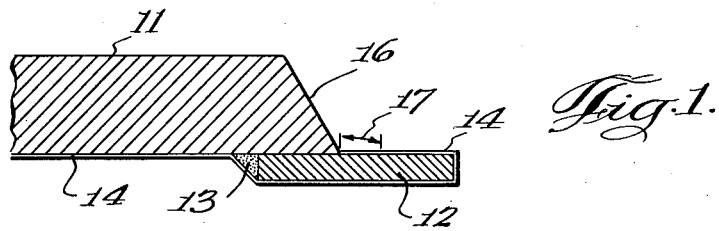
Figure 1 is a sectional view of an aluminized steel member with back-up bar welded thereto.

Referring to Figure 1, we have shown a steel member 11, which in this embodiment is a steel plate, to which has been welded a steel back-up bar 12 by means of a fillet weld 13. After welding, the member 11 having the back-up bar 12 welded thereto was dipped in molten aluminum and a coating of aluminum 14 was obtained which was about 0.006 inch thick. Coating of the surface 16 with aluminum is undesirable and may be prevented by conventional methods during the aluminum dipping step. Although it is not essential, it is desirable that the surface 17 on the back-up bar 12 be free of aluminum. Surface 17 extends from the edge of member 11 for a distance of about 1/16 inch wider than the root spacing between member 11 and a second member which is to be welded thereto. As an example: for a steel member 11 having a thickness of about 3/4 of an inch, surface 17 should preferably be about 1/4 of an inch. Surface 17 may be prepared by blocking the surface prior to dipping, or aluminum present after dipping may be removed by physical means such as machining, grinding, etc. If aluminum is present on surface 16 after the coating operation, it should be removed prior to welding.

Figure 2:
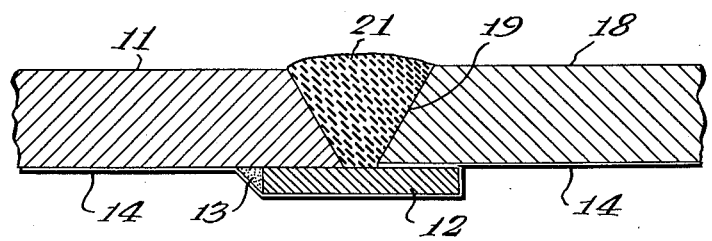
Figure 2 is a sectional view of two aluminized steel members welded together in accordance with the invention.

In Figure 2, a second steel member 18 is shown which is welded to the assembly shown in Figure 1. The steel member 18 is also coated with aluminum before welding while avoiding aluminum coating of the surface 19 as described in connection with surface 16 of member 11. After coating with aluminum, the steel member 18 is placed on the back-up bar 12, and weld 21 is made joining steel members 11, 18 and 12 integrally.

Other methods may be used to form the aluminum coating on the steel surfaces. For instance, an aluminum spraying technique may be used or aluminum compounds may be applied to the surfaces and a continuous coating of aluminum obtained by reduction of these compounds. In any event, this method of joining steel members is applicable wherein the coating of aluminum is relatively thin; for instance, up to about 0.06 inch. It is quite difficult to form coatings much thicker than this without effecting substantial diffusion of the aluminum into the steel member. Cladding techniques are necessary if a protective aluminum surface of substantially greater thickness than 0.06 inch is required. The technique of welding aluminum clad steel presents an altogether different problem to which the herein described method does not pertain.

Figure 3:
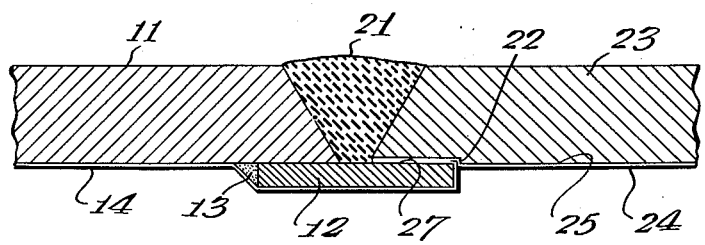
Figure 3 is a sectional view of two aluminized steel members welded together in accordance with another embodiment of the invention.

If precise lateral alignment of the steel members is required, we have found it desirable to form a groove 22 in steel member 23 before forming the aluminum coating 24 on surface 25 as shown in Figure 3. After forming the aluminum coating on surface 25, excess aluminum in groove 22 may be removed to enable the steel members 23 and 11 to be placed in lateral alignment before welding. It is contemplated that the same result may be achieved by recessing the surface 27 of back-up bar 12. When the steel members 11 and 23 are joined by weld 21, the aluminum coating on surface 27 of back-up bar 12 and surface 22 on steel member 23 are fused together by the heat involved in the welding step; a substantially uniform protective coating of aluminum is thus obtained.

We have found that the steel back-up bar 12 should be at least about 3/16 inch in thickness to avoid overheating the aluminum coating on the surface of back-up bar 12. If the thickness of back-up bar 12 is substantially less than about 3/16 inch in thickness, the aluminum coating on the back-up bar tends to oxidize and/or diffuse into the back-up bar causing a discontinuity in the aluminum coating and exposure of the steel surfaces. We have also found that the width of steel back-up bar 12 should be at least about 3/4 inch in width; if the width of the back-up bar 12 is substantially less than this, adequate mating of the surfaces 24 and 27 is not always attained due to warping and the like, resulting from weld 21. For instance, if member 11 is a steel plate of about 1/2 inch thickness, the back-up bar 12 should be at least 3/16 inch in thickness to avoid overheating. Inasmuch as most of the overheating is caused by the root pass weld, the thickness of the back-up bar 12 does not have to be increased proportionately to increasing thickness of steel member 11; thus the same back-up bar 12 may be used for practically any thickness of steel member 11, although it is preferable to increase the thickness of back-up bar 12 slightly for increases in thickness of steel member 11. A 3/16 inch back-up bar is preferable if member 11 is about 3/4 of an inch; a 3/8 inch back-up bar is preferable if steel member 11 is about 3 inches thick.

Figure 4:
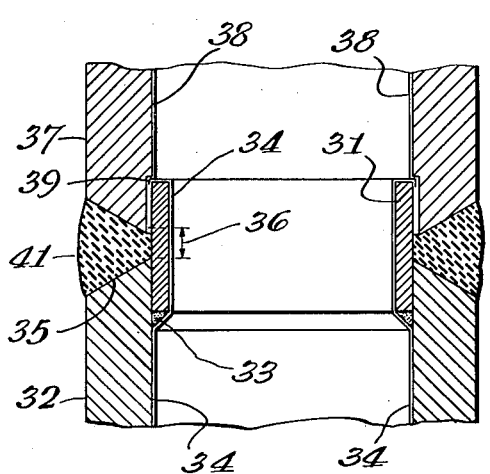
Figure 4 is a longitudinal cross-section of a pipe welded in accordance with the invention.

As pointed out hereinbefore, this method of joining aluminized steel surfaces is particularly applicable for joining steel pipe wherein a protective aluminum coating is provided on its inner surface. In Figure 4, a longitudinal cross-section of a pipe welded in accordance with our invention is shown. A back-up ring 31 is welded to a pipe 32 by means of weld 33. The pipe 32 and back-up ring 33 are then aluminum coated by dipping in molten aluminum or by other methods as hereinbefore described. An aluminum coating 34 is thus obtained. As pointed out for surface 16 in Figure 1, corresponding surface 35 must be substantially free of aluminum to permit sound welding. It is also preferable, although not essential, that surface 36, corresponding to surface 17 in Figure 1, is free of aluminum. A pipe 37 provided with an aluminum coating 38 is then slipped over the collar formed by back-up ring 31. The inner surface of pipe 38 may be provided with a recess 39 as described in connection with Figure 3 or the back-up ring 31 may be undercut to allow the pipe 37 to be placed in position. After placing the pipe 37 in position, a weld 41 is made whereby the pipes 32 and 37 are joined and the back-up ring 31 is welded to the pipes. As pointed out hereinbefore, the heat developed during the welding step causes the aluminum coating 38 and 34 to substantially fuse together in recess 39 and a substantially uniform protective coating of aluminum is thus obtained on the inner surface of the pipe.

Figure 5:
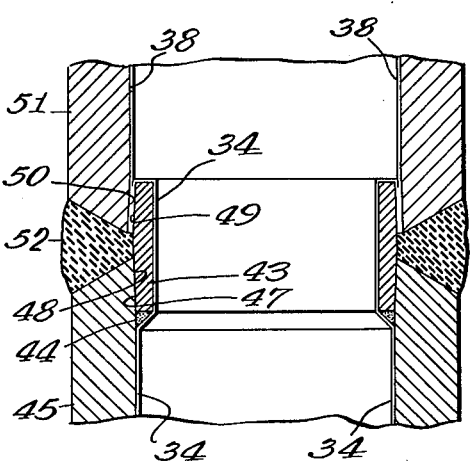
Figure 5 is a longitudinal cross-section of a pipe welded in accordance with another embodiment of the invention.

In place of the back-up ring 31 shown in Figure 4, a double tapered ring 43 may be used as shown in Figure 5. In this embodiment, the weld 44 which is made prior to coating the surfaces with aluminum and which joins the tapered ring 43 and pipe 45 causes the surface 47 on the tapered back-up ring 43, and the tapered surface 48 on pipe 45 to draw together very tightly due to contraction of the weld metal 44 upon cooling. Likewise the tapered surface 49 on back-up ring 43 and tapered surface 50 on pipe 51 are caused to mate together very tightly due to the contraction of the weld 52 upon cooling. The overall method of joining the pipes 45 and 51 in Figure 5 is similar to that described in connection with Figure 4.

It is contemplated that welding joints other than the V-groove illustrated in the drawings may be used; for instance, a U-groove might be used or even a simple butt joint separated slightly to allow welding from the bottom of the joint to the outer surface of the member. It is also contemplated that the members or pipes joined by the method hereinbefore described may consist of any of the carbon steels or stainless steels which may be coated with aluminum.

While specific examples of the invention have been described in some detail, other modifications will be apparent from the foregoing description to those skilled in the art.

We claim:

1. The method of joining steel pipe whereby a substantially continuous protective aluminum coating, not thicker than about 0.06 inch, is provided on the inner surface thereof, which method comprises welding a back-up ring on the inner surface of a first steel pipe whereby about one-half the width of said ring extends beyond the end of said pipe and which ring is at least about 3/16 inch in thickness and is at least about 3/4 inch in width, coating said back-up ring and the inner surface of said first steel pipe with aluminum, positioning a second aluminum coated steel pipe on said ring in welding relationship with said first steel pipe, and welding said first steel pipe to said second steel pipe whereby said back-up ring is welded to the edges of both steel pipes by the root pass of said welding step.

2. The method of claim 1 wherein the inner surface of said second steel pipe is recessed prior to coating with aluminum to accommodate a layer of aluminum between said recessed surface and said back-up ring.

3. The method of claim 1 wherein the surface of said back-up ring is recessed to accommodate said aluminum coating between said recessed surface and said second steel pipe.

4. The method of joining steel pipe whereby a substantially continuous protective aluminum coating not thicker than about 0.06 inch is provided on the inner surface thereof which method comprises tapering the inner surface of a first steel pipe to accommodate a double tapered back-up ring, which back-up ring is at least about 3/16 inch in thickness and is at least about 3/4 inch in width, welding said back-up ring on the inner surface of said first steel pipe whereby about one-half the width of said ring extends beyond the edge of said first steel pipe, coating said back-up ring and the inner surface of said first steel pipe with aluminum, positioning a second steel pipe on said back-up ring and in welding relationship with said first steel pipe, which second steel pipe is tapered on its inner surface to accommodate said tapered back-up ring and which pipe is coated with aluminum on its inner surface, and welding the first steel pipe to the second steel pipe whereby said back-up ring is welded to the edges of both steel pipes by the root pass of said welding step.

5. An article of manufacture which comprises a first steel pipe having an inner surface, an outer surface and an end, a second steel pipe having an inner surface, outer surface and an end which is spaced from but adjacent to the end of the first pipe, a steel back-up ring at least 3/16 inch in thickness and at least 3/4 inch in width overlapping the first and second pipes at their adjacent ends and having its outer surface adjacent the inner surface of each of said pipes, a weld between the first pipe and the back-up ring, a weld between the first and second pipes extending to said back-up ring and a continuous coating of aluminum not thicker than about .06 inch, said continuous coating of aluminum comprising a first coating of aluminum in fused contact with a second coating of aluminum, said first coating of aluminum being positioned to cover the inner surface of the first pipe up to the first named weld, said first named weld, and that portion of the surface of the back-up ring which extends from the first named weld across the inner surface of the back-up ring and to the second named weld, and said second coating of aluminum being positioned to cover the inner surface of the second pipe and in fused relationship with said first coating of aluminum at said back-up ring.

6. An article of manufacture which comprises a first steel tubular member having a relatively inaccessible aluminum coated inner surface, an outer surface and an end, a second steel tubular member having a relatively inaccessible aluminum coated inner surface, an outer surface and an end which is spaced from but adjacent to the end of the first steel tubular member, a steel back-up bar at least $3/16$ inch in thickness and at least $3/4$ inch in width overlapping the first and second steel tubular members at their adjacent ends and having its outer surface adjacent the inner surface of each of said steel tubular members, a weld between the first steel tubular member and the back-up bar, a weld between the first and second steel tubular members extending to said back-up bar and a continuous coating of aluminum not thicker than about .06 inch, said continuous coating of aluminum comprising a first coating of aluminum in fused contact with a second coating of aluminum, said first coating of aluminum being positioned to cover the inner surface of the first steel tubular member up to the first named weld, said first named weld, and that portion of the surface of the back-up bar which extends from the first named weld across the inner surface of the back-up bar and to the second named weld, and said second coating of aluminum being positioned to cover the inner surface of the second steel tubular member and in fused relationship with said first coating of aluminum at said back-up bar.

7. The method of joining steel tubular members having relatively inaccessible aluminum coated inner surfaces whereby a substantially continuous protective aluminum coating, not thicker than about 0.06 inch, is provided on the inner surface thereof, which method comprises welding a back-up bar on the inner surface of a first steel tubular member having a relatively inaccessible aluminum coated inner surface whereby about one-half the width of said bar extends beyond the end of said first steel member and which bar is at least about $3/16$ inch in thickness and is at least about $3/4$ inch in width, coating said back-up bar and the inner surface of said first steel tubular member with aluminum, positioning a second steel tubular member having a relatively inaccessible aluminum coated inner surface on said bar in welding relation to said first steel tubular member, and welding said first steel tubular member to said second steel tubular member whereby said back-up bar is welded to the edges of both steel tubular members by the root pass of said welding step.

References Cited in the file of this patent

UNITED STATES PATENTS

| | | |
|---|---|---|
| 1,961,117 | Wall | May 29, 1934 |
| 1,990,077 | Kershaw | Feb. 5, 1935 |
| 2,173,109 | Hamblin | Sept. 19, 1939 |
| 2,273,154 | Stromsoe | Feb. 17, 1942 |
| 2,412,271 | Kercher | Dec. 10, 1946 |
| 2,586,100 | Schultz | Feb. 19, 1952 |
| 2,653,211 | Andrus | Sept. 22, 1953 |
| 2,708,304 | Lundin | May 17, 1955 |
| 2,709,295 | Chyle | May 31, 1955 |